US008706723B2

(12) United States Patent
Huenemann et al.

(10) Patent No.: US 8,706,723 B2
(45) Date of Patent: Apr. 22, 2014

(54) NAME-SEARCH SYSTEM AND METHOD

(75) Inventors: Geoffrey William Huenemann, Vancouver (CA); Bradley James Francis Palmer, Surrey (CA); David Burton Humphrey, Vancouver (CA)

(73) Assignee: Jostle Corporation (CA)

( * ) Notice: Subject to any disclaimer, the term of this patent is extended or adjusted under 35 U.S.C. 154(b) by 7 days.

(21) Appl. No.: 13/166,651

(22) Filed: Jun. 22, 2011

(65) Prior Publication Data

US 2012/0330947 A1  Dec. 27, 2012

(51) Int. Cl.
*G06F 17/30* (2006.01)
(52) U.S. Cl.
CPC ............................. *G06F 17/30864* (2013.01)
USPC .................... 707/728; 707/830; 707/E17.014
(58) Field of Classification Search
CPC ................ G06F 17/30864; G06F 17/30867; G06F 17/30675; G06F 17/30011
USPC ................ 707/728, 830, 769, 754, 736, 780, 707/E17.059, 737, E17.046, E17.124, 707/E17.014, E17.017
See application file for complete search history.

(56) References Cited

U.S. PATENT DOCUMENTS

| | | | | |
|---|---|---|---|---|
| 5,333,317 | A * | 7/1994 | Dann ...................... | 707/999.005 |
| 6,895,403 | B2 * | 5/2005 | Cardwell et al. .............. | 707/758 |
| 6,963,871 | B1 * | 11/2005 | Hermansen et al. .... | 707/999.003 |
| 7,065,449 | B2 * | 6/2006 | Brewster et al. ................... | 702/5 |
| 7,333,966 | B2 * | 2/2008 | Dozier ........................... | 706/21 |
| 7,426,455 | B1 * | 9/2008 | Antony ............................. | 703/2 |
| 7,602,301 | B1 * | 10/2009 | Stirling et al. ............. | 340/573.1 |
| 7,873,621 | B1 * | 1/2011 | Datar et al. .................... | 707/706 |
| 7,877,375 | B1 * | 1/2011 | LeVan ........................... | 707/736 |
| 8,041,560 | B2 * | 10/2011 | Hermansen et al. ........... | 704/10 |
| 8,341,232 | B2 * | 12/2012 | Rashad et al. ................. | 709/206 |
| 8,370,366 | B2 * | 2/2013 | Adams et al. .................. | 707/749 |
| 8,548,997 | B1 * | 10/2013 | Wu ................. | 707/736 |
| 2002/0087521 | A1 * | 7/2002 | Lee ..................... | 707/3 |
| 2002/0091688 | A1 * | 7/2002 | Decary et al. ..................... | 707/6 |
| 2003/0037074 | A1 * | 2/2003 | Dwork et al. .................. | 707/500 |
| 2003/0191626 | A1 * | 10/2003 | Al-Onaizan et al. .............. | 704/8 |
| 2004/0024760 | A1 * | 2/2004 | Toner et al. ........................ | 707/6 |
| 2004/0078364 | A1 * | 4/2004 | Ripley et al. ..................... | 707/3 |
| 2004/0215610 | A1 * | 10/2004 | Dixon et al. ...................... | 707/3 |
| 2005/0165785 | A1 * | 7/2005 | Malkin et al. ................... | 707/10 |
| 2005/0216444 | A1 * | 9/2005 | Ritter et al. ....................... | 707/3 |
| 2005/0273468 | A1 * | 12/2005 | Hermansen et al. .......... | 707/100 |
| 2007/0005567 | A1 * | 1/2007 | Hermansen et al. ............. | 707/3 |
| 2007/0096975 | A1 * | 5/2007 | Maskell .......................... | 342/95 |
| 2007/0239741 | A1 * | 10/2007 | Jordahl ......................... | 707/100 |

(Continued)

OTHER PUBLICATIONS

Niraj Aswani, Kalina Bontcheva, and Hamish Cunningham—"Mining Information for Instance Unification"—The Semantic Web—ISWC 2006 Lecture Notes in Computer Science vol. 4273, 2006, pp. 329-342.*

(Continued)

*Primary Examiner* — Anh Ly
(74) *Attorney, Agent, or Firm* — Westberg Law Offices

(57) ABSTRACT

A computer-implemented method is disclosed. The method may include receiving a portion of a personal name and converting the portion to a normalized portion by reducing the one or more characters to their simplest equivalents. The method may further include searching a typographical index tree and a phonetic index tree to identify one or more keys matching the normalized portion. The method may further include compiling, ranking, and presenting a plurality of suggested matches identified during the searching.

28 Claims, 14 Drawing Sheets

(56) References Cited

U.S. PATENT DOCUMENTS

| | | | |
|---|---|---|---|
| 2007/0276845 A1* | 11/2007 | Geilich | 707/100 |
| 2008/0114583 A1* | 5/2008 | Al-Onaizan et al. | 704/2 |
| 2008/0133522 A1* | 6/2008 | Bordner et al. | 707/6 |
| 2008/0147642 A1* | 6/2008 | Leffingwell et al. | 707/5 |
| 2008/0244008 A1* | 10/2008 | Wilkinson et al. | 709/205 |
| 2008/0294616 A1* | 11/2008 | Schwalb | 707/5 |
| 2008/0312909 A1* | 12/2008 | Hermansen et al. | 704/9 |
| 2008/0319922 A1* | 12/2008 | Lawrence et al. | 705/36 R |
| 2009/0089283 A1* | 4/2009 | Khasin et al. | 707/6 |
| 2009/0106846 A1* | 4/2009 | Dupray et al. | 726/26 |
| 2009/0234826 A1* | 9/2009 | Bidlack | 707/5 |
| 2009/0254547 A1* | 10/2009 | Hirota | 707/5 |
| 2009/0319521 A1* | 12/2009 | Groeneveld et al. | 707/6 |
| 2010/0010973 A1* | 1/2010 | Harrington | 707/4 |
| 2010/0217781 A1* | 8/2010 | Benhadda et al. | 707/803 |
| 2011/0078150 A1* | 3/2011 | Rashad et al. | 707/741 |
| 2011/0184962 A1* | 7/2011 | Palmer et al. | 707/754 |
| 2011/0196924 A1* | 8/2011 | Hargarten et al. | 709/204 |
| 2012/0136650 A1* | 5/2012 | Udupa et al. | 704/9 |
| 2012/0330947 A1* | 12/2012 | Huenemann et al. | 707/728 |

OTHER PUBLICATIONS

C Phua, V Lee, K Smith-Miles—"The personal name problem and a recommended data mining solution"—Encyclopedia of Data Warehousing and . . . , 2006—Citeseer—pp. 1-8.*

* cited by examiner

| Sample Record 154 | |
|---|---|
| Key_Firstname | Robert |
| Key_Nickname | |
| Key_Lastname | Gardener |
| Key_Rolename | Leader, Project XYZ |
| Key_Title | CEO |
| Key_Location | Paris |

Scores for Sample Record

| | Key_Firstname | Key_Nickname | Key_Lastname | Key_Rolename | Key_Title | Key_Location |
|---|---|---|---|---|---|---|
| bob | 3(A3) or 3(A4) | 0 | 0 | 0 | 0 | 0 |
| paris | 0 | 0 | 0 | 0 | 0 | 5(F1) |
| oat | 0 | 0 | 0 | 0 | 0 | 0 |

FIG. 14

| bob | Greater of 3(A3) and 3(A4) |
|---|---|
| paris | 5(F1) |
| oat | 3(G5) |
| TOTAL | 17 |

Scores for Sample Record

| | Key_Firstname | Key_Nickname | Key_Lastname | Key_Rolename | Key_Title | Key_Location |
|---|---|---|---|---|---|---|
| bob | 3(A3) or 3(A4) | 0 | 0 | 0 | 0 | 0 |
| paris | 0 | 0 | 0 | 0 | 0 | 5(F1) |
| oatmeal | 0 | 0 | 0 | 0 | 0 | 0 |

FIG. 16

| | |
|---|---|
| bob | Greater of 3(A3) and 3(A4) |
| paris | 5(F1) |
| oatmeal | 7(G5) |
| TOTAL | -6　156 |

FIG. 17

NAME-SEARCH SYSTEM AND METHOD

BACKGROUND

1. Field of the Invention

This invention relates to enterprise collaboration systems and more particularly to systems and methods for searching data that lacks a strict taxonomy and identifying people that match inexact search criteria.

2. Background of the Invention

Humans often organize themselves into cooperative groups and organizations such as companies, joint ventures, partnerships, trusts, project teams, human families, clubs, unions, societies, political parties, governments, charitable organizations, armies, and the like. Whether of a personal, professional, or political nature, each such organization involves contributors who are affiliated with the organization by birth, invitation, employment, voluntary involvement, etc. Moreover, contributors occupy various roles in the governance, management, operations, and administration of such organizations.

The roles and the contributors who occupy them interact with each other within the context of relationships. These relationships, whether formally defined as part of an established hierarchy or informally agreed upon based on a pattern of interactions, involve delegation of activities and tasks that are undertaken on behalf of the organization. The activities and tasks may be assigned to, or performed by, a contributor based on his or her role within an organization or their particular skill set or qualifications. People may be affiliated with an organization as members or as external contributors, and their designated role may reflect this status. For example, a member of a company may be a manager or an officer, while an external contributor may be an independent contractor or a consultant.

In each such organization, there is a need to organize and visualize the various contributors, roles, and relationships to ensure efficiency in the organization's operations and management. To this end, organizations typically create and use hierarchical organization charts and trees containing visual depictions. Organizations may also create and use various other types of depictions of themselves in the form of relationship diagrams, task descriptions, project plans, and other similar graphical and illustrative views.

Whether during a building process or phase or during subsequent use, such tools may require a user to locate one or more persons. This may require searching of large datasets, be they on the Internet or in enterprise-based files. Such locating may be complicated by the fact that many individuals have names that are intentionally spelled in unconventional ways. Furthermore, unlike content, names are used cross-culture and cross-language. Thus, diverse phonetic and spelling conventions are used. Nicknames are also used extensively. Such nicknames often bear no letter-based or logical match to the name of the person who the searcher is seeking. Typographical errors (be they introduced by the searcher or located within the dataset being searched) are also common.

People-targeted searches also present unique challenges in terms of identifying which matched names are most likely the ones of interest to the searcher. In some cases, the concept of credibility or popularity can be used, but often this is not available or not appropriate. Crowd sourcing techniques can be used to identify people that are frequently of interest to other searchers. However, this does not often work well because the user population is small. Also, in many cases, the searcher may not be looking for the most popular person, but rather the most knowledgeable person, a person in a specific role, etc.

In view of the foregoing, what is needed is a system and method facilitating rapid, computerized searching for and location of persons.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 14 is a schematic diagram illustrating one embodiment of a matrix showing the scores awarded to the record of FIG. 13 for each term within a sample query comprising "bob paris oat";

FIG. 15 is a schematic diagram illustrating one embodiment for calculating a total score for the record of FIG. 13 given the query of FIG. 14;

FIG. 16 is a schematic diagram illustrating one embodiment of a matrix showing the scores awarded to the record of FIG. 13 for each term within a sample query comprising "bob paris oatmeal"; and FIG. 17 is a schematic diagram illustrating one embodiment for calculating a total score for the record of FIG. 13 given the query of FIG. 16.

DETAILED DESCRIPTION

Figure 1:
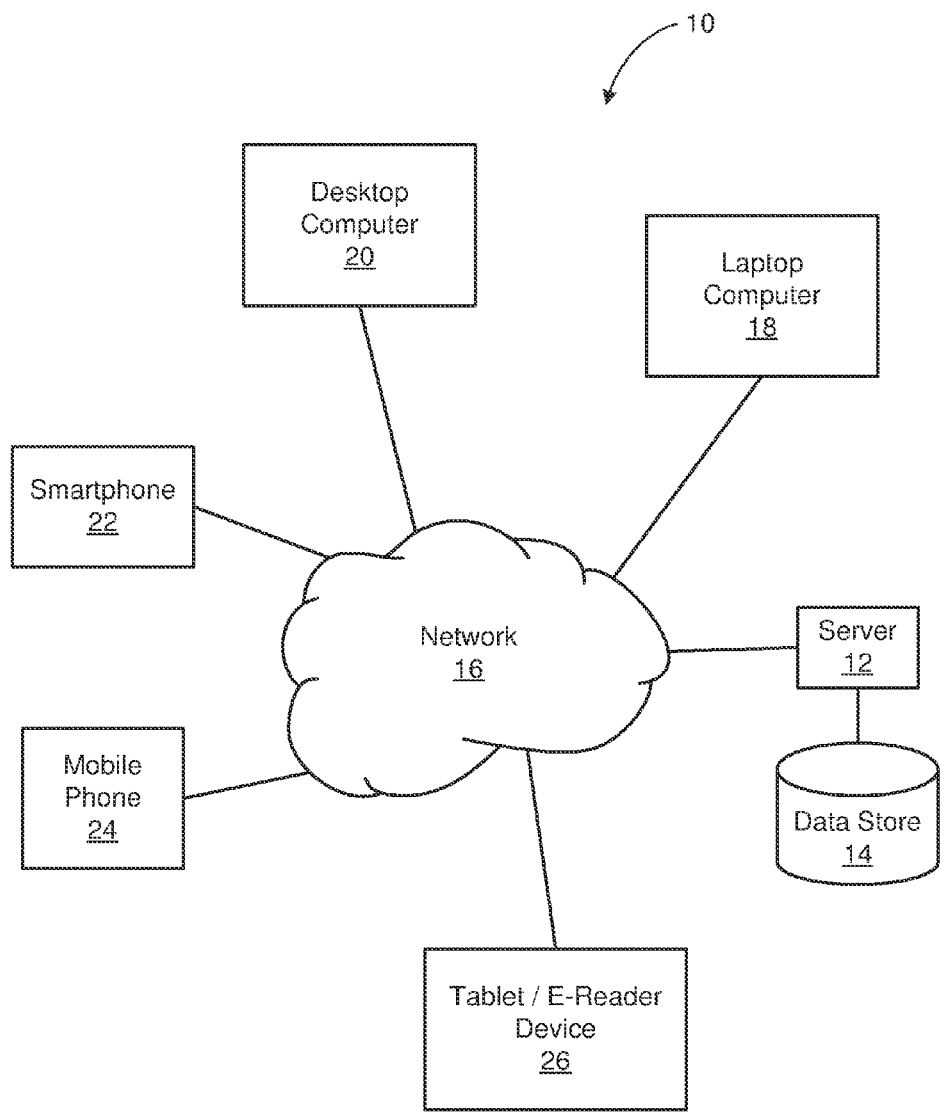
FIG. 1 is a schematic diagram of one embodiment of a computing environment in which systems and methods discussed herein may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In the following disclosure, well-known elements have been illustrated in schematic or block diagram form to avoid obscuring the invention in unnecessary detail. Additionally, for the most part, details concerning network communications, data structures, and the like have been omitted inasmuch as such details are not considered necessary to obtain a complete understanding of the invention, and are considered to be within the understanding of persons of ordinary skill in the relevant art. It is further noted that functions described herein may be performed in either hardware or software, or a combination thereof.

In accordance with an embodiment of the present invention a computer-implemented method is provided, comprising: receiving, from a user, a first portion of a personal name, the first portion comprising one or more characters; converting the first portion to a normalized portion of the personal name by reducing the one or more characters to their simplest equivalents; searching a main index to identify one or more first keys matching the normalized portion of the personal name; searching a phonetic index to identify one or more second keys matching the normalized portion of the personal name; compiling a first plurality of suggested matches, the first plurality of suggested matches comprising the union of indexed items corresponding to the one or more first keys and indexed items corresponding to the one or more second keys; and presenting, to the user, at least a portion of the first plurality of suggested matches.

The method can further comprise ranking the plurality of suggested matches according to a predicted relevance to the user. The method can further comprise permuting the normalized portion of the personal name to identify one or more typographical permutations thereof having a Damerau-Levenshtein distance of one. The method can further comprise searching both the main index and the phonetic index to identify one or more third keys matching the one or more typographical permutations. The plurality of suggested matches can further comprise indexed items corresponding to the one or more third keys. The method can further comprise receiving, from the user, a second portion of the personal name, the second portion being adjacent to and received after the first portion, the second portion comprising one or more characters, the first and second portions collectively forming a string of characters. The method can further comprise converting the string of characters to a normalized string of characters by reducing the one or more characters of the string of characters to their simplest equivalents. The method can further comprise searching the main index to identify one or more fourth keys matching the normalized string of characters. The method can further comprise searching the phonetic index to identify one or more fifth keys matching the normalized string of characters. The method can further comprise compiling a second plurality of suggested matches, the second plurality of suggested matches comprising the union of indexed items corresponding to the one or more fourth keys and indexed items corresponding to the one or more fifth keys. The method can further comprise presenting, to the user, at least a portion of the second plurality of suggested matches. The presenting of at least a portion of the first plurality of suggested matches can occur after the receiving of the first portion and before the receiving of the second portion. The presenting of at least a portion of the second plurality of suggested matches can occur after the receiving of the second portion.

In accordance with an embodiment of the present invention a computer-implemented method comprises: receiving, from a user, a portion of a personal name, the portion comprising three or more characters; converting the portion to a normalized portion by reducing the three or more characters to their simplest equivalents; permuting the normalized portion to identify one or more permutations thereof having a Damerau-Levenshtein distance of one; searching a main index to identify one or more first keys matching the normalized portion or the one or more permutations; searching a phonetic index to identify one or more second keys matching the normalized portion or the one or more permutations; compiling a first plurality of suggested matches, the first plurality of suggested matches comprising the union of indexed items corresponding to the one or more first keys and indexed items corresponding to the one or more third keys; and presenting, to the user, at least a portion of the first plurality of suggested matches.

The method can further comprise receiving, from the user, a second portion of the personal name, the second portion being adjacent to and received after the first portion, the second portion comprising one or more characters, the first and second portions collectively forming a string of characters. The method can further comprise converting the string of characters to a normalized string of characters by reducing the one or more characters of the string of characters to their simplest equivalents. The method can further comprise searching the main index to identify one or more third keys matching the normalized string of characters. The method can further comprise searching the phonetic index to identify one or more fourth keys matching the normalized string of characters. The method can further comprise compiling a second plurality of suggested matches, the second plurality of suggested matches comprising the union of indexed items corresponding to the one or more third keys and indexed items corresponding to the one or more fourth keys. The method can further comprise presenting, to the user, at least a portion of the second plurality of suggested matches.

In accordance with an embodiment of the present invention a computer-implemented method comprises: receiving, from a user, a first portion of a personal name, the first portion comprising one or more characters; converting the first portion to a normalized portion of the personal name by reducing the one or more characters to their simplest equivalents; searching a main index to identify one or more first keys matching the normalized portion of the personal name;

searching a phonetic index to identify one or more second keys matching the normalized portion of the personal name; scoring typographically each of the one or more second keys; identifying, via the scoring, a higher scoring portion of the one or more second keys; compiling a first plurality of suggested matches, the first plurality of suggested matches comprising the union of indexed items correspond to the one or more first keys and indexed items corresponding to the higher scoring portion of the one or more second keys; and presenting, to the user after the compiling, at least a portion of the first plurality of suggested matches.

In accordance with an embodiment of the present invention a system for managing organizational data is provided, the system comprising: a processor; and a memory coupled to the processor, the memory comprising computer-executable instructions that when executed by the processor perform operations including receiving data from a first user defining a first organizational relationship, receiving data from a second user defining a second organizational relationship, generating a set of organizational relationships wherein the set of organizational relationships includes the first organizational relationship and the second organizational relationship, receiving, from a third user, a first portion of a personal name, the first portion comprising one or more characters, converting the first portion to a normalized portion of the personal name by reducing the one or more characters to their simplest equivalents, searching a main index to identify one or more first keys matching the normalized portion of the personal name, searching a phonetic index to identify one or more second keys matching the normalized portion of the personal name, compiling a first plurality of suggested matches, the first plurality of suggested matches comprising the union of indexed items corresponding to the one or more first keys and indexed items corresponding to the one or more second keys, and presenting, to the user, at least a portion of the first plurality of suggested matches.

Referring to FIG. 1, in selected embodiments, systems and methods in accordance with the present invention may be supported by or executed within a computing environment 10. Such an environment 10 may include one or more servers 12. A server 12 may access one or more data stores 14 (e.g., databases, indexes, files, or the like). A server 12 may connect to a data communication network 16. A data communication network 16 may comprise a local area network (LAN), a wide area network (WAN), the Internet, or the like.

One or more devices may connect to a server 12, and a corresponding data store 14, via the data communication network 16. Such devices may include, but are not limited to, one or more laptop computers 18, desktop computers 20, smart phones 22, mobile phones 24, tablet or e-reader devices 26, or combinations thereof. In operation, such devices 18, 20, 22, 24, 26 may send commands to a server 12. In response, a server 12 may serve data from the data store 14, alter data within the data store 14, add data to the data store 14, or the like or combinations thereof.

In selected embodiments, a server 12 may retrieve organizational data from a data store 14 and send it to one or more of the devices 18, 20, 22, 24, 26 via the data communication network 16. The devices 18, 20, 22, 24, 26 may use the organizational data to perform various functions. For example, they may use the data to create visual depictions illustrating roles, contributors, teams, and relationships within or corresponding to the particular organization. In certain embodiments, one or more of the devices in a system 10 in accordance with the present invention may be configured to operate within or support a cloud computing environment.

Figure 2:
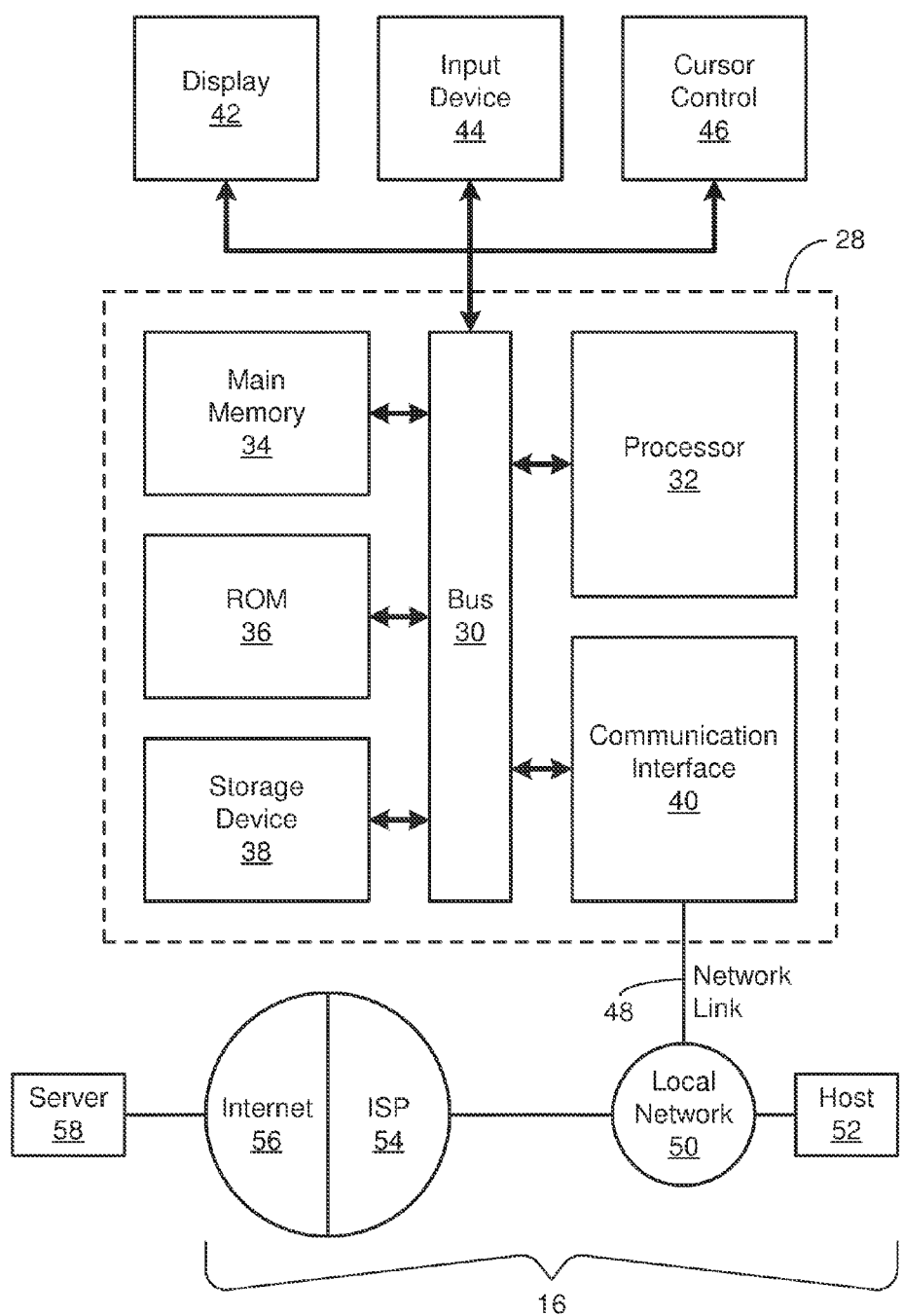
FIG. 2 is a schematic block diagram of one embodiment of a computer system for supporting and executing the systems and methods described herein.

Referring to FIG. 2, a diagrammatic view of an example computer 28 is illustrated. One or more of the devices 12, 18, 20, 22, 24, 26 of a system 10 in accordance with the present invention may be configured as or include such a computer 28. In selected embodiments, a computer 28 may include a bus 30 or other communication mechanism 30, a processor 32, main memory 34, read only memory (ROM) 36, one or more additional storage devices 38, a communication interface 40, or the like or sub-combinations thereof.

A bus 30 or other communication mechanism 30 may support communication of information. A processor 32 may be connected to a bus 30 and process information. In selected embodiments, a processor 304 may be a specialized or dedicated microprocessor configured to perform particular tasks in accordance with the present invention by executing machine-readable software code defining the particular tasks. Main memory 34 (e.g., random access memory (RAM) or other dynamic storage device) may be connected to a bus 30 and store information and instructions to be executed by a processor 32. Main memory 34 may also store temporary variables or other intermediate information during execution of such instructions.

Read only memory (ROM) 36 or some other static storage device 36 may be connected to a bus 30 and store static information and instructions for a processor 32. An additional storage device 38 (e.g., a magnetic disk, optical disk, memory card, or the like) may be connected to a bus 30. An additional storage device 38 may store information, instructions, or some combination thereof. A communication interface 40 may also be connected to a bus 30. A communication interface 40 may provide or support two-way data communication between a computer 28 and one or more external devices (e.g., others devices 12, 18, 20, 22, 24, 26 contained within a computing environment 10).

In selected embodiments, a computer 28 may be connected (e.g., via a bus 30) to a display 42. A display 42 may use any suitable mechanism to communicate information to a user of a computer 28. For example, a display 42 may include or utilize a cathode ray tube (CRT), liquid crystal display (LCD), light emitting diode (LED) display, or the like to present information to a user of a computer 28.

One or more input devices 44 (e.g., an alphanumeric keyboard) may connected to a bus 30 to communicate information and commands to a computer 28. In selected embodiments, one input device 44 may provide or support control over the positioning of a cursor. Such a cursor control device 46 may be configured as a mouse, a trackball, a track pad, or cursor direction keys. A cursor control device 46 may communicate direction information and command selections to a processor 32 and control cursor movement on a display 42. A cursor control device 46 may have two degrees of freedom, allowing the device 46 to specify positions in a plane.

A computer 28 may be used to transmit, receive, define, and depict organizational data representing roles, contributors, teams, and relationships. In selected embodiments, such transmitting, receiving, defining, and depicting of organizational data may be in response to a processor 32 executing one or more sequences of one or more instructions contained in main memory 34. Such instructions may be read into main memory 34 from another computer-readable medium (e.g., a storage device 38).

Execution of sequences of instructions contained in main memory 34 may cause a processor 32 to perform one or more of the procedures or steps described herein. In selected embodiments, one or more processors 32 in a multi-processing arrangement may also be employed to execute sequences of instructions contained in main memory 34. Alternatively, or in addition thereto, hard-wired circuitry may be used in place of, or in combination with, software instructions to implement procedures or steps in accordance with the present invention. Thus, embodiments in accordance with the present invention may not be limited to any specific combination of hardware circuitry and software.

The term "computer-readable medium" as used herein may refer to any medium that participates in providing instructions to a processor 32 for execution, or that stores any type of information. Such a medium may take many forms, including but not limited to, non-volatile media, volatile media, and transmission media. Non-volatile media may include optical or magnetic disks, such as an additional storage device 38. Volatile media may include dynamic memory, such as main memory 34. Transmission media may include coaxial cables, copper wire, and fiber optics, including the wires associated with bus 30. Transmission media may also take the form of acoustic or light waves, such as those generated during radio wave and infrared data communications.

Common forms of computer-readable media may include, for example, a floppy disk, a flexible disk, hard disk, magnetic tape, or any other magnetic medium, a CD-ROM, any other optical medium, punch cards, paper tape, any other physical medium with patterns of holes, RAM, PROM, EPROM, FLASH-EPROM, any other memory card, chip, or cartridge, a carrier wave as described hereinafter, or any other medium from which a computer can read.

Various forms of computer readable media may be involved in carrying one or more sequences of one or more instructions to a processor 32 for execution. For example, instructions may initially be carried on a magnetic disk of a remote computer. The remote computer may load the instructions into its dynamic memory and send the instructions over a data network using a network interface. A network interface (e.g., a communication interface 40) local to a computer 28 may receive the data and use an infrared transmitter to convert the data to an infrared signal. An infrared detector coupled to a bus 30 may receive the data carried in the infrared signal and place the data on the bus 30. The bus 30 may carry the data to main memory 34, from which a processor 32 may retrieve and execute the instructions. The instructions received by the main memory 34 may optionally be stored on a storage device 38 either before or after execution by a processor 32.

In selected embodiments, a communication interface 40 may provide or support external, two-way data communication to or via a network link 48. For example, a communication interface 40 may be a wireless network interface controller or a cellular radio providing a data communication connection. Alternatively, a communication interface 40 may comprise a local area network (LAN) card providing a data communication connection to a compatible LAN. In any such embodiment, a communication interface 40 may send and receive electrical, electromagnetic, or optical signals conveying information.

A network link 48 may provide data communication through one or more networks to other data devices (e.g., others devices 12, 18, 20, 22, 24, 26 contained within a computing environment 10). For example, a network link 48 may provide a connection through a local network 50 of a host computer 52 or to data equipment operated by an Internet Service Provider (ISP) 54. An ISP 54 may, in turn, provide data communication services through the Internet 56. Accordingly, a computer 28 may send and receive commands, data, or combinations thereof, including program code, through one or more networks 50, 56, a network link 48, and communication interface 40. Thus, a computer 28 may interface or otherwise communicate with a remote server 58 (e.g., server 12). Instructions received by a computer 28 may be executed by a processor 32 as they are received, stored for later execution (e.g., stored on a storage device 38), or some combination thereof.

Figure 3:
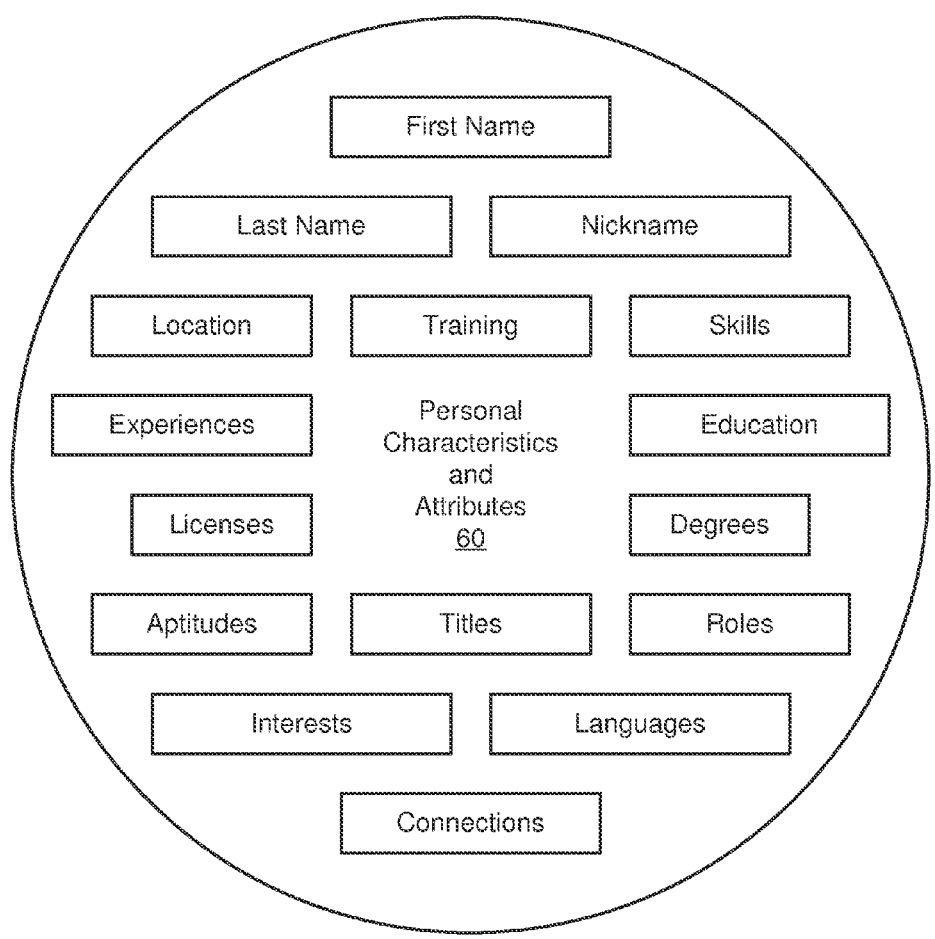
FIG. 3 is a schematic diagram illustrating various personal characteristics and attributes that may be stored and searched.

Referring to FIG. 3, a person may have various personal characteristics 60 or attributes 60. Certain characteristics 60 or attributes 60 may assist in identifying the particular individual. Other characteristics 60 or attributes 60 may assist in defining resources offered by the individual. Suitable characteristics 60 or attributes 60 may include first name (e.g., given name), last name (e.g., surname), nickname, location, training, skills, experiences, licenses, education, degrees, aptitudes, roles, interests, languages, connections or relationships, and the like.

Collectively, such characteristics 60 and attributes 60 may uniquely identify a particular individual. Accordingly, such characteristics 60 and attributes 60 may be used in search systems and methods in accordance with the present invention. For example, a searcher may be seeking to identify a particular individual known to the searcher only by a nickname. Thus, the nickname may be the basis of the search.

Alternatively, a searcher may be seeking to identify an individual having a particular skill set. For example, a searcher may be seeking an engineer to conduct a structural, finite element analysis. Accordingly, that skill set may be the basis of the search. In still other situations, a searching may be seeking to identify a particular individual having multiple known characteristics 60. For example, a searcher may be seeking to contact an individual named "Tim" located in the Toronto office. Thus, a search system in accordance with the present invention may support searches based on one or more characteristics 60 or attributes 60.

Figure 4:
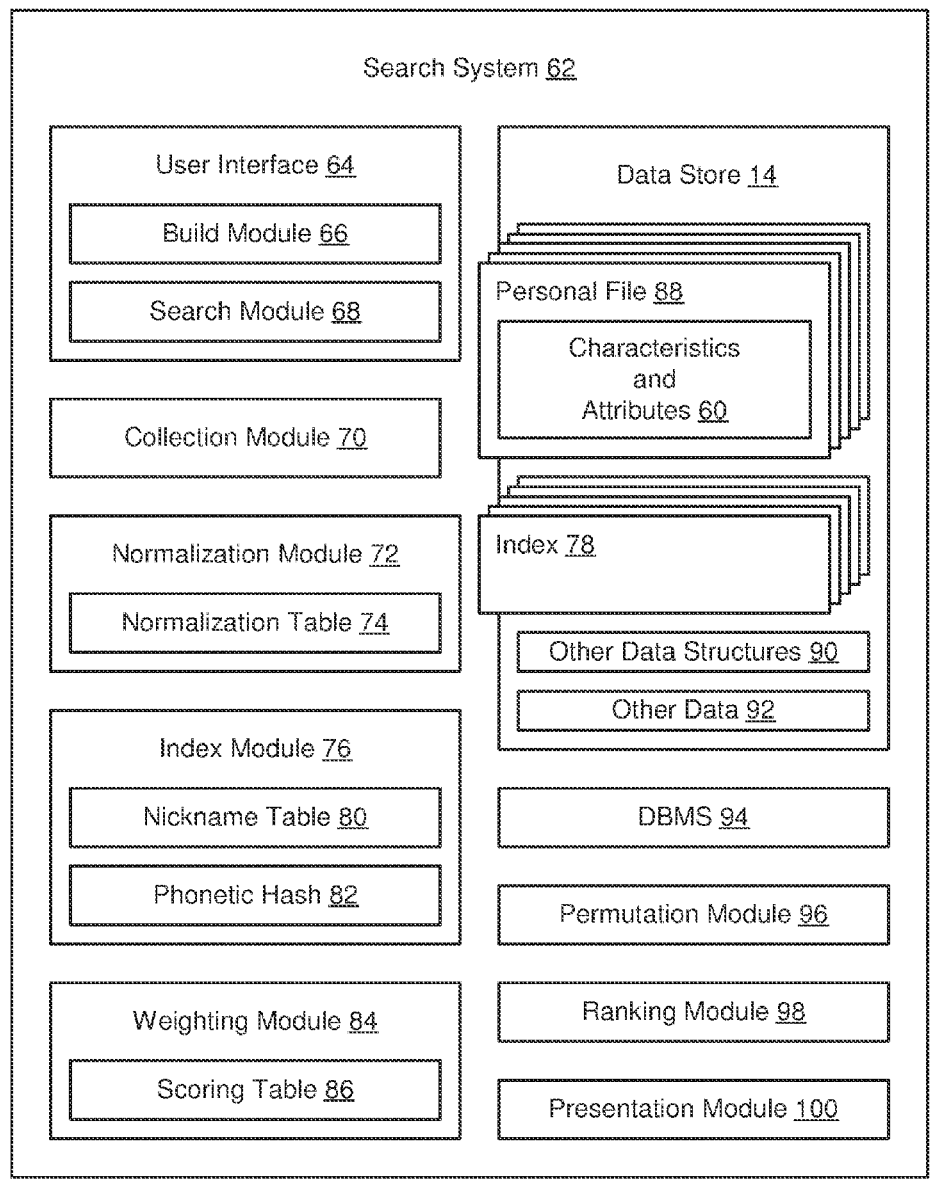
FIG. 4 is a schematic block diagram of one embodiment of a search system.

Referring to FIG. 4, a search system 62 in accordance with the present invention may operate within any suitable computer environment (e.g., computing environment 10) as a standalone application or in conjunction with or as part of a larger system. For example, an enterprise collaboration system is disclosed in U.S. patent application Ser. No. 13/121,181, filed Mar. 25, 2011, which is hereby incorporated by reference. A search system 62 may form part of such a system and enable users to quickly located individuals, teams, etc. therewithin.

A search system 62 in accordance with the present invention may include a user interface 64. A user interface 64 may enable and support interaction between one or more users and the search system 62. In selected embodiments, a user interface 64 may support users of different types. For example, a user interface 64 may support one or more builders of the system 62, maintainers of the system 62, users of the system 62 (e.g., searchers), or some combination thereof.

In certain embodiments, a user interface 64 may include or be coupled with a build module 66. A build module 66 may enable or support a build process. For example, a build module 66 may provide a mechanism enabling data to be properly added to one or more data stores 14 of a system 62 in accordance with the present invention. In selected embodiments, a build module 66 may supervise or manage other components or modules of a system 62 to ensure data is properly processed and stored within a data store 14. A build module 66 may support or enable a primary or initial build. Alternatively, or in addition thereto, a build module 66 may support, enable, or manage incremental additions of data keeping a system 62 up-to-date.

A user interface 64 may also include or be coupled to a search module 68. A search module 68 may provide a mechanism enabling searching of one or more data stores 14. Accordingly, a search module 68 may receive one or more search terms or portions thereof input by a searcher. In selected embodiments, a search module 68 may supervise or manage other components or modules of a system 62 to ensure that search terms or portions thereof are properly processed and that the search or searches corresponding thereto are properly performed.

A search system 62 in accordance with the present invention may include a collection module 70. In certain applications, it may be desirable to store information reflecting the characteristics 60 or attributes 60 of a particular individual. A collection module 70 may be responsible for collecting such information and passing it to a data store 14.

In selected embodiments, a collection module 70 may collect information via one or more interviews. For example, a collection module 70 may issue or provide one or more questions or prompts, then record the answers entered (e.g., manually entered) in response thereto. Alternatively, or in addition thereto, a collection module 70 may crawl various files pertaining to a particular person. In so doing, a collection module may extract (e.g., automatically extract) terms or information characterizing that person.

For example, in an interview a collection module 70 may identify (and potentially receive access to) an account of the particular person with a social networking website or system (e.g., a professional networking system such as LINKEDIN or the like). With such information, the collection module 70 may crawl the account to collect, in an automated manner, information reflecting the characteristics 60 or attributes 60 of the particular individual. Other documents, files, or the like that may be processed by a collection module 70 may include a resume or curriculum vitae, educational transcripts, or the like.

In selected embodiments, a search system 62 may include a normalization module 72. A normalization module 72 may standardize selected data processed within a search system 62. For example, in a build process, a normalization module 72 may standardized certain characteristics 60 or attributes 60 (e.g., first names, last names, locations, and the like) before they are passed to a data store 14. Alternatively, or in addition thereto, a normalization module 72 may standardize one or more search terms or portions thereof entered by a searcher during a search.

A normalization module 72 may include or be linked to a normalization table 74. A normalization table 74 may articulate the standards or rules to be applied by a normalization module 72. In selected embodiments, a normalization table 74 may establish relationships between various characters (e.g., Unicode characters) and their simplest equivalents. For example, a normalization table 74 may identify "a" as the simplest equivalent of "à," "A," and the like.

In certain embodiments, once each index key is normalized in a build process, the entry may be stored in an index. Accordingly, in selected embodiments, a search system 62 may include an index module 76. An index module 76 may assist in generating one or more indexes 78 facilitating or speeding searches for certain data contained within a data store 14. Accordingly, an index module 76 may generate and maintain one or more indexes 78 as desired or necessary to provide or enable a desired search speed.

An index module 76 may include or be linked to a nickname table 80. A nickname table 82 may articulate the nicknames to be indexed by an index module 76. Alternatively, or in addition thereto, an index module 76 may include a phonetic hash 82. A phonetic hash 82 may articulate the standards or rules to be applied in a phonetic analysis of certain data. In selected embodiments, a phonetic hash 82 may be applied in conjunction with indexing of data contained within a data store 14. Thus, a phonetic hash 82 may be used in a build process. Alternatively, or in addition thereto, a phonetic hash 82 may be used to process one or more search terms or portions thereof entered by a searcher during a search.

In selected embodiments, a search system 62 may include a weighting module 84. A weighting module 84 may enforce certain value judgments designed to improve the operation of a search system 62. For example, it may be determined that keys that score well on both phonetic and typographical metrics are less likely to unpleasantly surprise a searcher. Accordingly, a weighting module 84 may ensure that keys that are only phonetically close rank lower than keys that are close both phonetically and typographically.

A weighting module 84 may include or be linked to a scoring table 86. A scoring table 86 may articulate the weights or scores to be applied by a weighting module 84. In selected embodiments, a scoring table 86 may be tunable. Accordingly, the values of a scoring table 86 may be altered (e.g., externally altered, automatically adjusted, or the like) in a controlled manner.

A search system 62 in accordance with the present invention may include one or more data stores 14. A data store 14 may include one or more databases organizing various files, records, or the like. For example, one or more databases may organize various personal files 88 containing data reflecting one or more characteristics 60, attributes 60, or the like. A data store 14 may also include or be coupled with one or more indexes 78 facilitating or speeding searches for certain data contained within the data store 14. A data store 14 may further include other data structures 90 and other data 92 as desired or necessary.

In selected embodiments, a search system 62 may include one or more database management systems 94. A database management system (DBMS) 94 may interface between a database contained within a data store 14 and other modules or systems seeking to search, change, add, or delete data stored within the database. A database management system 94 may also control which users have access to selected data within a database.

A search system 62 may include a permutation module 96. In certain embodiments, a permutation module 96 may generate permutations expanding a term or character string to selected variations thereof or therefrom. Accordingly, a permutations module 96 may support searching of terms or character strings other than those exactly entered by a searcher. This may correct or compensate for errors within the inputs of the searcher. It may also compensate for errors or unconventional spellings within data of a data store 14.

In selected embodiments, a search system 62 may include a ranking module 98. Operating in conjunction with a weighting module 84, a ranking module 98 may receive and order a plurality of suggested matches identified during one or more searches. A ranking module 98 may rank the suggested matches in order of decreasing predicted relevance to a corresponding searcher. A weighting module 84, a ranking module 98, or some combination thereof may specify and enforce a cutoff. Accordingly, not all suggested matched located need be presented to a searcher. A cutoff may ensure that only the most relevant suggested matches are presented.

A search system 62 may include a presentation module 100. In selected embodiments, a presentation module 100 may operate in conjunction with a user interface 64 to present one or more suggested matches to a searcher. Accordingly, a searcher may select the suggested match that appears to the searcher to be the record or individual sought.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages.

Embodiments in accordance with the present invention may include hardware, software, or combinations of hardware and software that may collectively or individually be referred to herein as a "module," "system," or the like. Such designations may include or cover anything from one line of code to many lines of code. Such code may be stored on a single memory device (e.g., ROM 36, storage device 38, etc.) or distributed across multiple memory devices. For example, the code may be stored on multiple memory devices located remotely from one another and connected by a network 16. Similarly, such code may be executed by a single processor 32 or by a multiple processors 32 located remotely from one another and connected by a network 16.

Figure 5:
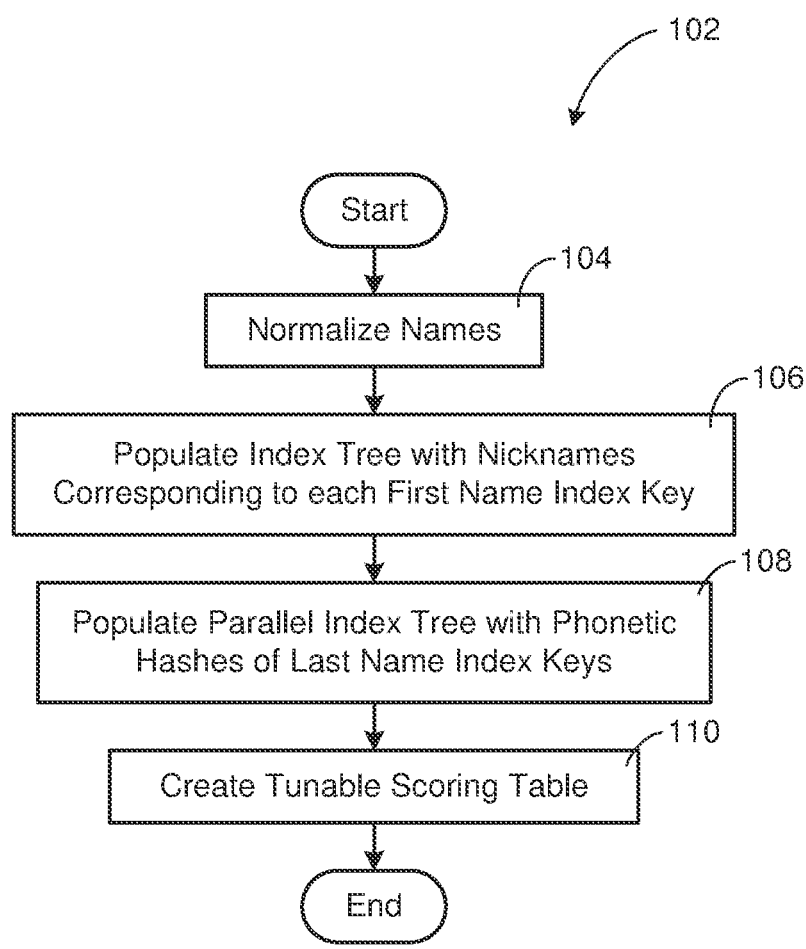
FIG. 5 is a schematic block diagram of one embodiment of a build process.

Referring to FIG. 5, selected embodiments in accordance with the present invention may provide an enhanced search process that is able to quickly provide, with limited computational resources, a list of names that best match inexact search criteria. The data being searched may include or reflect on various characteristics 60 or attributes 60 such as names and other tags mined from social site profiles, published resumes, and the like, and automatically extracting tags that relate to the experience, connections, education, interests, and the like of an individual.

In certain embodiments, a method 102 in accordance with the present invention may comprise a build process. That is, the method 102 may include steps for readying a system 62 to perform searches. Such a method 102 may begin with normalization 104 of selected characters. In selected embodiments, normalization 104 may comprise reduction of "similar" characters to their simplest equivalents. For example, normalization 104 may include replacing most punctuation with spaces. It may also include replacing characters like "à" or "A" with a simple "a". Accordingly, after normalization 104, should a user (e.g., searcher) type "diaz," the system may find "Díaz" as an exact match.

Normalization 104 may be accomplished in any suitable manner. In selected embodiments, normalization may be accomplished with a lookup table applied to one or more index keys. Once each index key is normalized, the entry may be stored in an index. If desired, the original index string may also be stored for later comparisons and display.

A method 102 may also include populating one or more indexes 78 (e.g., index trees). For example, for first name keys, the method 102 may include populating 106 an index with each index key's set of nicknames. Alternatively, or in addition thereto, a method 102 may include populating 108 an index 78 (e.g., an index containing the main keys or a separate, parallel index) with phonetic hashes of certain keys (e.g., all first name keys, all last name keys, other keys, or subsets or combinations thereof). Accordingly, after one or more such indexes 78 have been populated 106, 108, should a user (e.g., searcher) type "bob smith", the system 62 may find "Robert Smythe" as a fuzzy match.

Any suitable phonetic hash 82 may be used when generating a phonetic index 78. For example, the Double Metaphone algorithm may be used. In selected embodiments, a subset of all other keys for a phonetic node may also be mapped, depending upon the available processing power. In selected embodiments, the phonetic hashing algorithm may be detuned so that it produces a relatively generous list of possible matches.

A method 102 in accordance with the present invention may include creation 110 of a scoring table 86 (e.g., a tunable scoring table 86). A tunable scoring table 86 may provide relative weights to different kinds of matches. The relative weights may be based on whether the typed and index keys are the same length, which field the index key came from, or the like. For example, in selected embodiments, a system 62 in accordance with the present invention may use a scoring table 86 and supporting code to produce a single, comparable metric that gives weighted ratings based on how long a string is, spelling accuracy, sound accuracy, information source (e.g., name, title, etc.) and whether the search key has been seen before. A scoring table 86 may include negative weightings for unfound keys in multi-key search requests.

Through empirical testing, the values of such a table 86 may be optimized to produce "expected" results. Exact matches are always preferred. However, for inexact matches, index keys that are likely to be what a searcher is expecting are reasonably likely to score higher than index keys that are not what the searcher is expecting. This may be a subjective standard. However, it may assist in addressing the fact that both false negatives and false positives may be perceived by searchers as significant problems, even though all the "matches" in question may be inexact.

Figure 6:
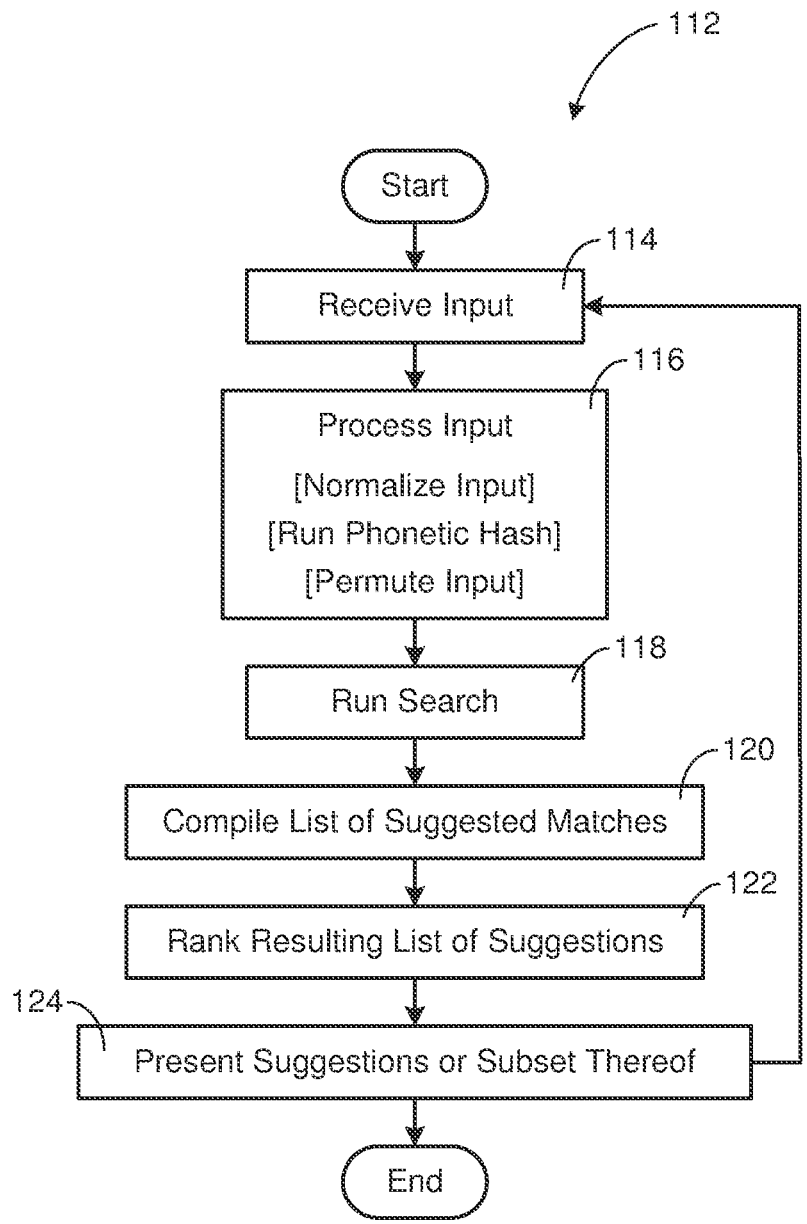
FIG. 6 is a schematic block diagram of one embodiment of a search process.

Referring to FIG. 6, once a system 62 has been built, it may be used by one or more searchers. A method of use 112 may begin when a system 62 receives 114 an input. In selected embodiments, a system 62 may receive 114 an input from a searcher. For example, a searcher may begin typing the name of someone the searcher desires to locate, contact, or the like.

Upon receipt of an input or an initial portion thereof (e.g., a first character), a system 62 may begin processing 116 the input, running 118 searches with respect to the input, or some combination thereof. For example, as a searcher starts typing, the typed input or key may be normalized, then used to search an index 78 for matching indexed items. Nicknames corresponding to this input or key, and phonetic hashes of it, may be searched.

Additionally, an input may be permuted. For example, an input or key may be permuted to each string that would have a Damerau-Levenshtein distance of one. That is, all strings may be identified that have one character added, one character removed, one pair of characters transposed, or one character replaced from the actual typed input or key. Each such permutation may also be searched in an appropriate index 78. Accordingly, in operation, "dfonald," "donld," "odnald," and "gonald" may all map to "Donald."

After or during the processing 116 and searching 118, a system 62 may compile 120 and rank 122 a list of suggested matches. In selected embodiments, this may include application or use of a scoring table 86. For example, a tunable scoring table 86 may be used, in conjunction with actual phonetic scores, typographical scores, information identifying which field a key came from, and the total length of each key, to rank the resulting list of suggested matches.

In selected embodiments, a search module 68, weighting module 84, ranking module 98, or some combination or subcombination thereof may generate scores for typographical closeness, phonetic closeness, or the like. If a key scores well on both phonetic and typographical metrics, it may be less likely to unpleasantly surprise a searcher. Terms that are only phonetically close (e.g., "Ken" and "gun") may rank lower than pairs of terms that are both phonetically and typographically close. This may be especially true when the typed key is short (e.g., a small prefix of the real index key).

Running a full set of typographical permutations, even with careful optimization, may be computationally expensive. On the other hand, phonetic matches may provide a rich vein of keys to mine for typographical matches at a relatively low computational cost. Moreover, by checking actual phonetic matches, a system 62 in accordance with the present invention may accommodate the diverse cultural roots of surnames. Accordingly, by combining typographical and phonetic searching, a system 62 in accordance with the present invention may be computationally efficient while producing subjectively good results.

In selected embodiments, a phonetic hash 82 may be used in one or more ways. For example, a system 62 may feed all search terms into a phonetic hash function 82 and store the results in an index 78 (e.g., radix tree) parallel to a normal spelling index 78. The system 62 may also feed inputs (e.g., typed keys or portions thereof) through the same phonetic hash function 82. Accordingly, a system 62 may search an index 78 to find a full or partial phonetic match.

A phonetic match may be detuned so that a system 62 returns more than the usual number of matching nodes. A system 62 may typologically score all or certain phonetic matches. For example, a system 62 may typographically score each of the phonetically matched keys, remove from that set any that score too low to be likely matches, and present a list of up to a certain number (e.g., ten) of suggested matches having the best overall scores. In selected embodiments, a system 62 in accordance with the present invention may (1) use easily computed phonetic matches and check them for close enough spelling (discarding phonetic matches that do not have a typographical score of at least some threshold value) and (2) use easily-computed typographical matches and check them for good enough phonetics (discarding typographical matches that do not have a phonetic score of at least some threshold value). A preliminary list of suggested matches may include the mathematical union of indexes items corresponding to the remaining phonetic matches and indexed items corresponding to the remaining typographical matches.

Accordingly, in selected embodiments, a system 62 in accordance with the present invention may avoid doing an exhaustive search for typographical matches. Doing thorough typological matching may be geometrically harder than selected methods of the present invention. Accordingly, a system 62 or relevant portion thereof may operate with sufficient speed to conduct the necessary normalization, searching, scoring, ranking, presenting, and the like for each character as it is input by a searcher. The code may be fast enough to keep up with a searcher's typing.

A system 62 may iterate through the edit-distance-one searches (i.e., strings having a Damerau-Levenshtein distance of one) because such permuations typically comprise a small, finite set with a high probability of being what a searcher meant to type. Accordingly, a system 62 may find a large number of quality matches while running as fast as a searcher may type an input.

In selected embodiments, Dice's Coefficient, Levenshtein Edit Distance, or a combination thereof may be used to score how close a mistyped term is to a known search key. For example, in certain embodiments, phonetic matches may be passed through a typological filter, based on key length. The longer the word, the more letters the system 62 expects will be correct. Lower scoring terms may be weeded out.

For keys longer than "n" letters (where n may be set to an integer such as three, four, five, six, etc., with four being currently preferred), a system 62 may loop through all one-edit-distance typographical error permutations, and see if any results thereof are substantially better than what was actually typed. This may be tunable, with a threshold set at four times improvement being currently preferred. In practice, this may find nearly all the cases where a searcher inadvertently added, removed, or substituted a letter, or changed the order of two letters. However, it may not result in false matches displacing good ones if the searcher actually input (e.g., typed) what he or she intended to input.

In such embodiments, a system 62 may meaningfully rank 122 the relative match quality of a hypothetical typed key that phonetically matches one individual's last name, exactly matches another individual's a nickname, and looks like a typographical error of yet another individual's job title. Scores may be modestly lowered for cases where the index key has already been seen by a searcher (e.g., previously presented to a searcher as a suggested match). This may favor unique suggested matches. Accordingly, in operation, a system 62 may suggest "Smith," "Smithers," and "Smythe" instead of the first three "Smith" records.

In cases of multiple keys, a system 62 may start by seeking to find the key that produces the smallest set of matches. These matches may then be further refined by scoring the other keys normally. In selected embodiments, to facilitate such a calculation, each indexed item (e.g., tree node) of a selected index 78 may store the total count of all subtending items. A system 62 may start with any indexed item. However, if a searcher has already entered certain data, a system 62 may select which data to focus on to improve efficiency. For example, if a searcher has so far entered "grapefruit s," the system 62 may start off looking for "s" keys in indexed items that match "grapefruit," rather than starting with the converse or generic set intersection techniques.

In selected embodiments, a scoring table 86 may include negative score weightings. This may enable soft removal of suggested matches in cases where there are multiple typed keys and a target node has some but not all of these keys present, providing soft removal of results that only have matches to most of the search terms. For example, if three keys are typed, and one is not found, the system 62 may decide when the omission is significant enough relative to the other two matches to remove the result from a list of suggested matches.

A scoring table 86 may include entries for misspelled and mistyped words. This may enable a system 62 in accordance with the present invention to meaningfully compare the worth of various keys or inputs. For example, it may enable a system 62 to meaningfully compare a phonetically correct last name and a correctly spelled job title, and return the actual entry a searcher is more likely to have been looking for in the search.

Once a list of suggested matches is compiled 120 and ranked 122, the list or a portion thereof may be presented 124 to the corresponding searcher. In selected embodiments, no more than ten suggested matches may be deemed useful or ever displayed. Accordingly, it may be possible for a system 62 to perform several tactical coding optimizations, especially early in a new search. For instance, it may be undesirable to examine every node with at least one tag starting with "a" when the user has so far only typed "a" into the search field.

In addition to ordering suggested matches based on a net score, suggested matches below a certain threshold may be automatically discarded. Accordingly, if a system 62 has fewer than about ten suggested matches that a searcher may recognize as reasonable, the system 62 may suppress (e.g., not display) the weakest of the suggested matches.

Figure 7:
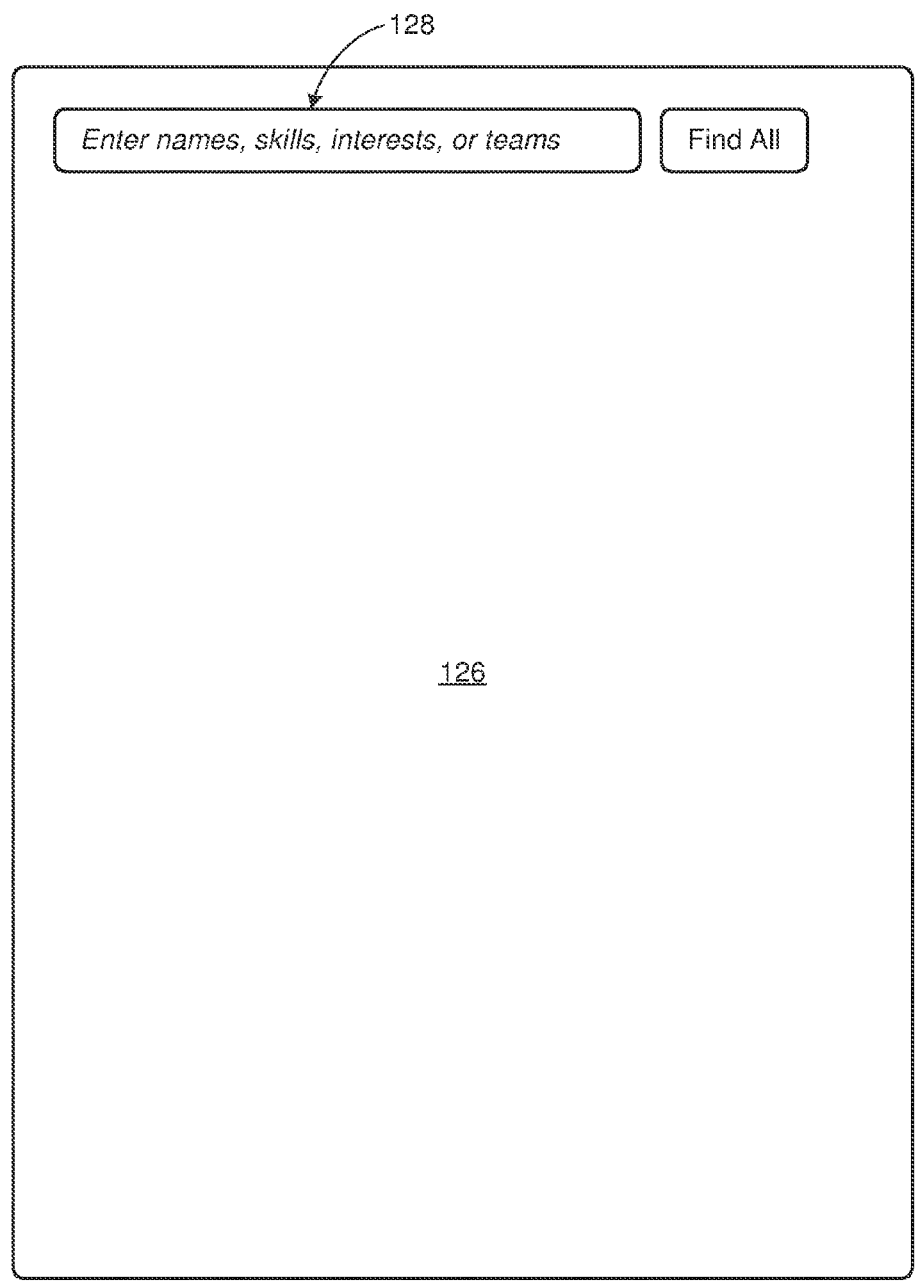
FIG. 7 is a schematic diagram illustrating one embodiment of a display space having a search field for receiving inputs from a searcher.

Referring to FIG. 7, a system 62 (e.g., user interface 64, search module 68, or the like or combination thereof) in accordance with the present invention may present, within a display space 126, a search field 128 into which a searcher may enter one or more Unicode characters. The characters entered may corresponding to one or more individuals or entities the searcher desires to locate, contact, etc. For example, the characters may correspond to a name, skill, interest, team, or the like.

Figure 8:
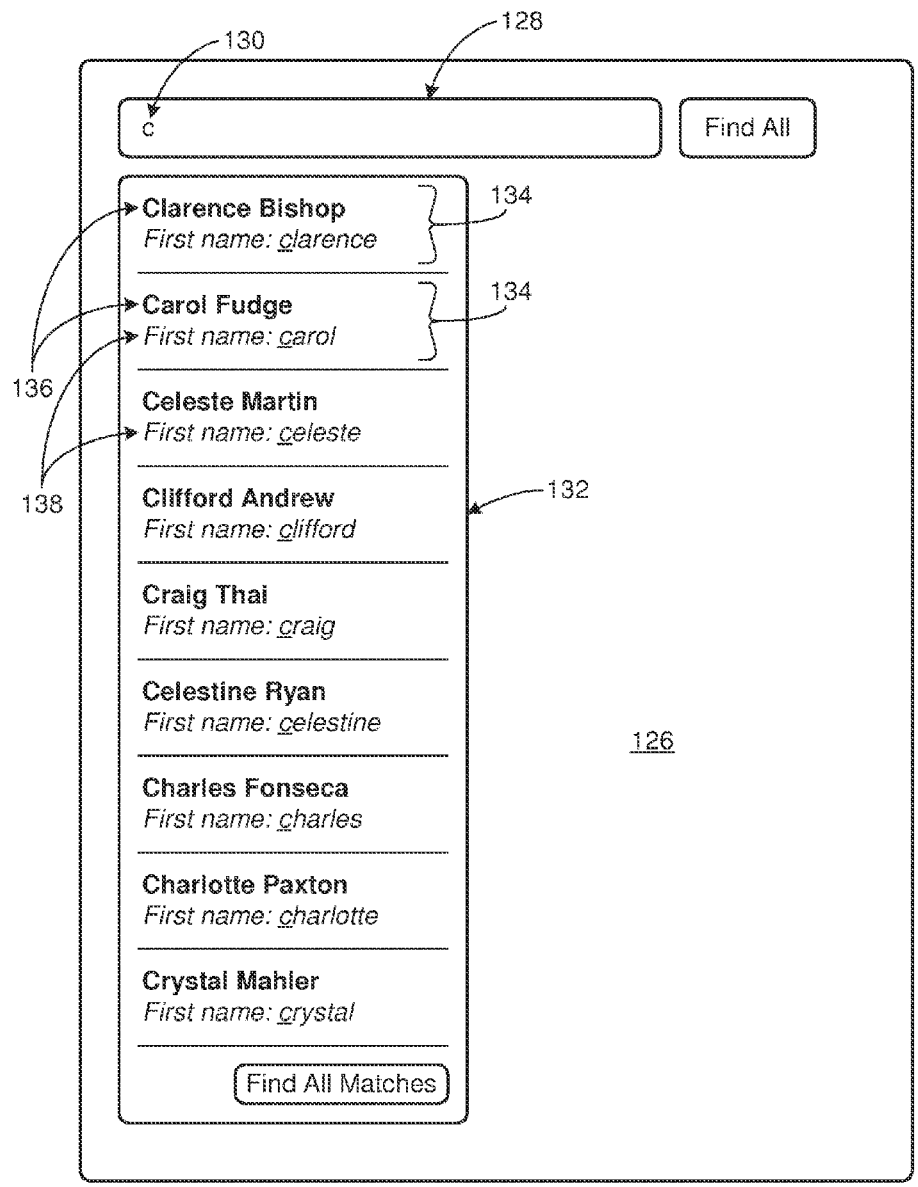
FIG. 8 is a schematic diagram illustrating the display space of FIG. 7 after one character has been entered into the search field and the corresponding search system has compiled and presented to a searcher a list of suggested matches corresponding to the one character.

Referring to FIG. 8, upon receiving a first character 130, a system 62 may begin a search process 112. The speed of the process 112 may be such that a list 132 of suggested matches is presented 124 before a searcher enters a second character. Accordingly, substantially immediately after entering a first character 130 (e.g., within about 100 milliseconds), a searcher may be able to evaluate the list 132 and determine whether a desired target had been identified. If it has, the searcher may select it and, thereby, terminate the present search.

In selected embodiments, each entry 134 of a list 132 may prominently display the complete name 136 of a corresponding individual. Each entry 134 may also contain data 138 identifying or communicating the reason why the particular entry 134 is being listed. For example, if the first character 130 entered by a searcher is "c," then the various entries 134 of a corresponding list 132 may identify or communicate which corresponding characteristic 60 or attribute 60 starts with or includes a "c." In the illustrated embodiment, the list 132 corresponding to the first character 130 indicates that all entries were selected because the corresponding first names of each began with the letter "c."

Figure 9:
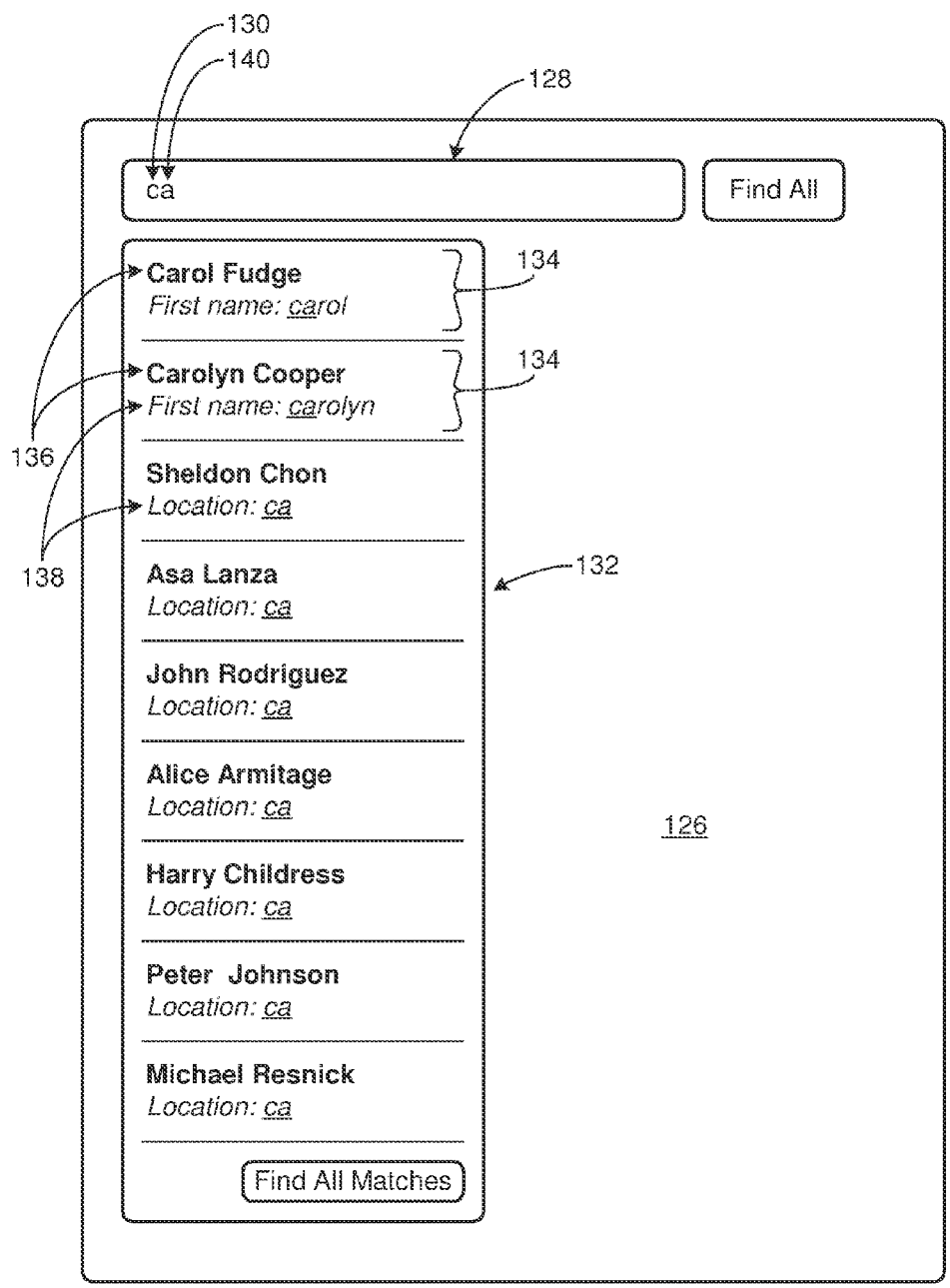
FIG. 9 is a schematic diagram illustrating the display space of FIG. 7 after two characters have been entered into the search field and the corresponding search system has compiled and presented to a searcher a list of suggested matches corresponding to the two characters.

Referring to FIG. 9, upon receiving a second character 140, a system 62 may begin another search process 112. The speed of the process 112 may be such that a list 132 of suggested matches is presented 124 before a searcher enters a third character. Accordingly, substantially immediately after entering a second character 140, a searcher may be able to evaluate a corresponding list 132 and determine whether a desired target had been identified. If it has, the searcher may select it and, thereby, terminate the present search.

In the illustrated embodiment, a searcher has entered an "a" as the second character 140. Thus, the input received 114, processed 116, and searched 118 may be the character string "ca." A list 132 corresponding to the character string containing the first and second characters 130, 140 indicates that certain entries 134 were selected because the corresponding first names all began with the letters "ca." The list 132 further indicates that certain entries 134 were selected because the corresponding locations all began with the letters "ca" or comprise a "ca" abbreviation.

Figure 10:
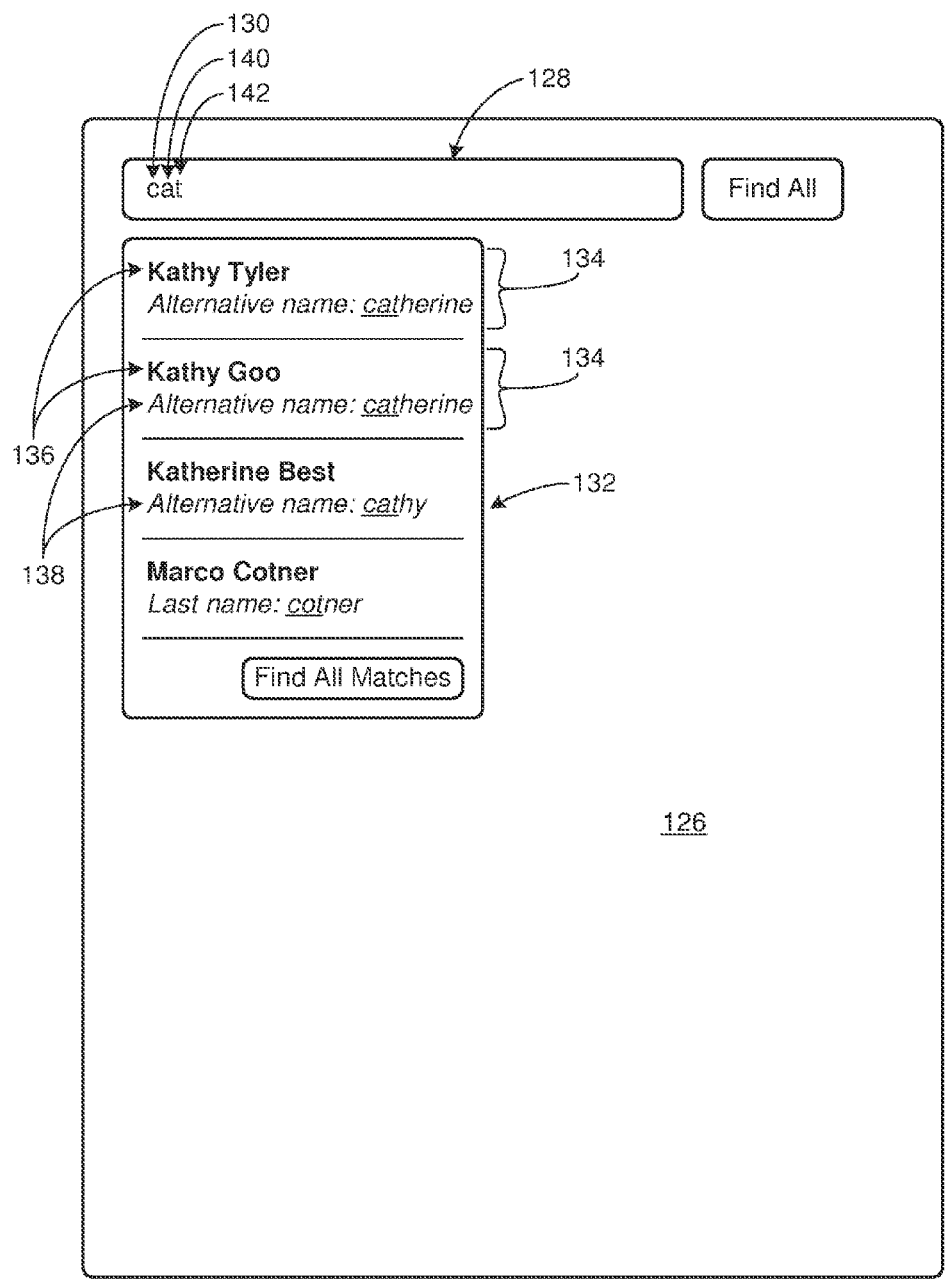
FIG. 10 is a schematic diagram illustrating the display space of FIG. 7 after three characters have been entered into the search field and the corresponding search system has compiled and presented to a searcher a list of suggested matches corresponding to the three characters.

Referring to FIG. 10, upon receiving a third character 142, a system 62 may begin another search process 112. In the illustrated embodiment, a searcher has entered a "t" as the third character 142. Thus, the input received 114, processed 116, and searched 118 may be "cat." A list 132 corresponding to the character string containing the first, second, and third characters 130, 140, 142 indicates that certain entries were selected because the corresponding alternative names (e.g., alternative spellings of the first names) all began with the letters "cat." The list 132 further indicates that one entry 134 was selected because the corresponding last name began with the letters "cot." If the searcher determines that the list 132 contains a desired target, the searcher may select that target. Alternatively, the searcher may input another character.

Figure 11:
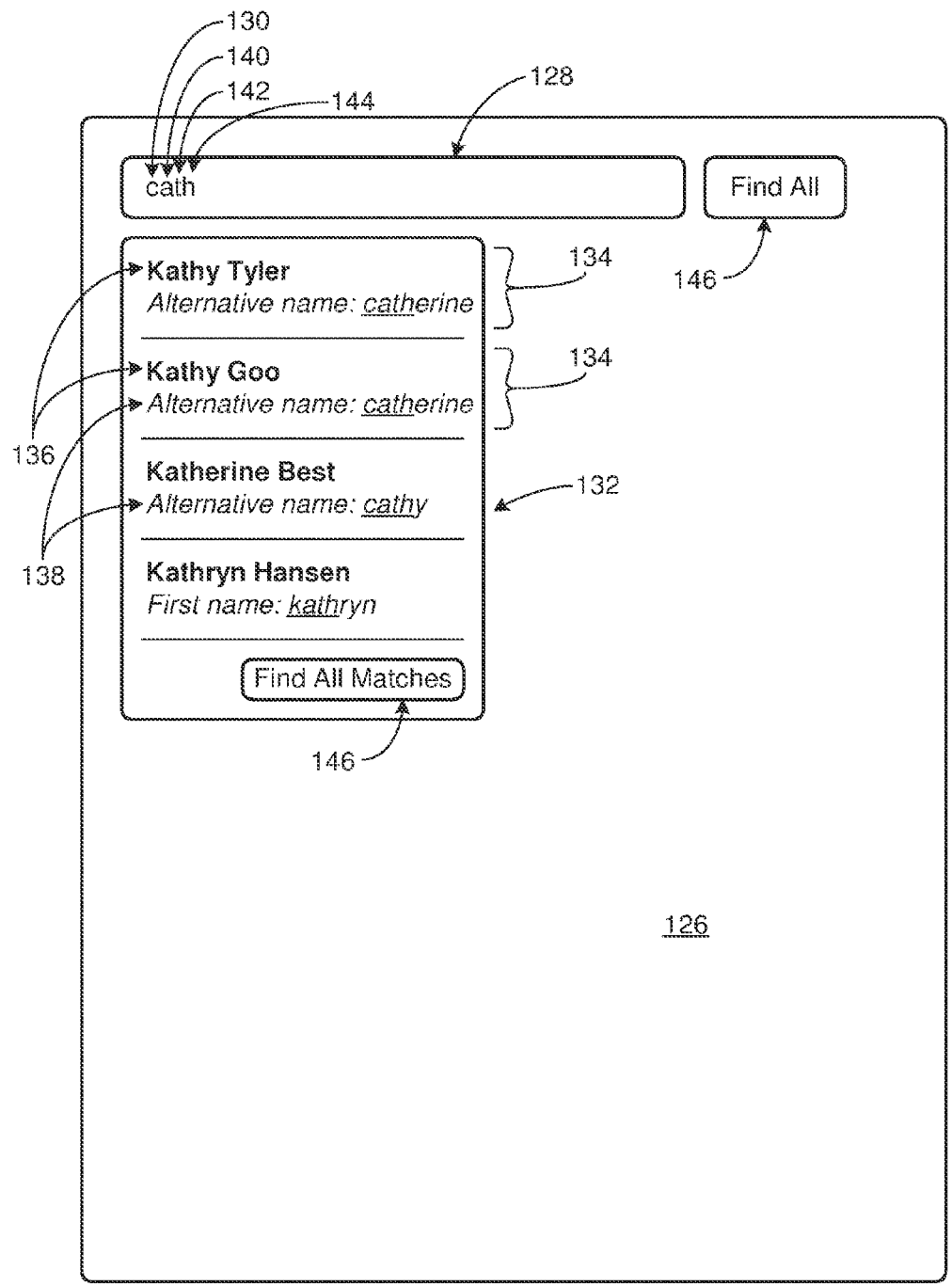
FIG. 11 is a schematic diagram illustrating the display space of FIG. 7 after four characters have been entered into the search field and the corresponding search system has compiled and presented to a searcher a list of suggested matches corresponding to the four characters.

Referring to FIG. 11, upon receiving a fourth character 144, a system 62 may begin another search process 112. In the illustrated embodiment, a searcher has entered an "h" as the fourth character 144. Thus, the input received 114, processed 116, and searched 118 may be "cath." A list 132 corresponding to the character string containing the first, second, third, and fourth characters 130, 140, 142, 144 indicates that certain entries were selected because the corresponding alternative names (e.g., alternative spellings of the first names) all began with the letters "cath." The list 132 further indicates that one entry 134 was selected because the corresponding first name began with the letters "kath." Again, if the searcher determines that the list 132 contains a desired target, the searcher may select that target.

As more characters are received 114 by a system 62, the system 62 may be more discriminating in which suggested matches are presented 124 to a searcher. Accordingly, in selected applications or situations, as more characters are received 114, the number of entries 134 provided on subsequent lists 132 may decrease. A searcher may continue to add characters to his or her search string until a desired target is provided on a list 132. If necessary, a searcher may go back and change certain characters within a search string. With each such change, a system 62 may begin another search process 112.

If, after adding a desired number of characters, the desired target has not yet been presented 124, then a searcher may initiate a "find all" function. In selected embodiments, this may be done by selecting a "find all" button 146 or the like. Upon initiation of such a function, a system 62 may present 124 to a searcher an expanded list of all entries 134 having a relation to the search string. Accordingly, the system 62 may withhold judgment on such entries 134 and pass that judgment on to the searcher.

Figures 12, 13:
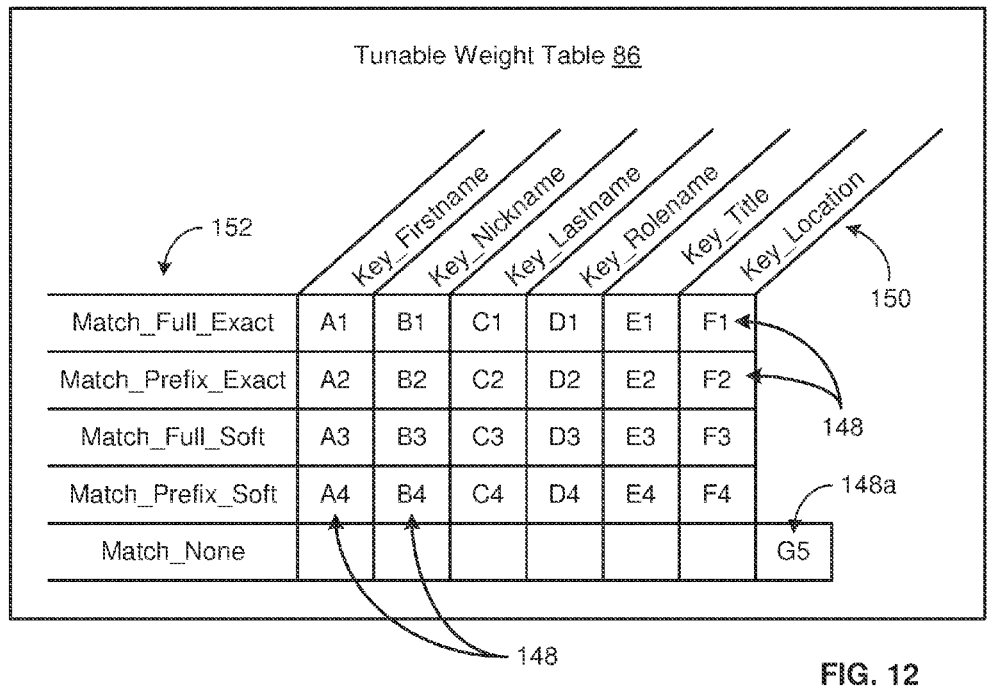
FIG. 12 is a schematic diagram illustrating one embodiment of a tunable weight table wherein the various numeric weights are represented by A1, A2, B1, B2, etc.
FIG. 13 is a schematic diagram illustrating one embodiment of a record that may be indexed by and stored within a search system.

Referring to FIG. 12, in selected embodiments, a weight table 86 (e.g., a tunable weight table 86) may articulate or identify various weights 148 corresponding to various keys 150 and match types 152. For example, a weight table 86 may identify various keys 150 such as a first name key, nickname key, last name key, role key, title key, location key, and the like or combinations or sub-combinations thereof. The weight table 86 may also identify match types 152 such as a exact full match, exact prefix match, soft full match, soft prefix match, no match, and the like or combinations or sub-combinations thereof. Accordingly, the weight table 86 may provide weights 148 for each unique pair of key 150 and match type 152. Additionally, a weight table 86 may include one or more weights 148a to be applied when no match is identified. Such weights 148a may be negative values.

Referring to FIG. 13, one potential method for using a weight table 86 may be explained using a sample record 154. In operation, a search system 62 (e.g., a datastore 14) may store many such records. In the illustrated embodiment, the sample record identifies an individual having "Robert" as the first name key, nothing as the nickname key, "Gardener" as the last name key, "Leader, Project XYZ" as the role key, "CEO" as the title key, and "Paris" as the location key.

Referring to FIG. 14, a method in accordance with the present invention may include using a tunable weighting table 86, comparing each typed key against each known field, multiplying by typed key length, finding the best score for each key, adding those up, and producing a single, aggregate, sortable score. For example, assuming a user enters "bob paris oat" in a search field 128, a search system 62 (e.g., a weighting module 84) may score the sample record 154 in the manner illustrated.

Specifically, the input "bob" may be considered to be a soft full match of "Bob." That is, "Bob" is a well known nickname for "Robert." While the sample record 154 does not contain the nickname "Bob," the system 62 may know that "Robert" might be called "Bob" (or that the searcher might think that "Robert" goes by "Bob") so the nickname may be automatically tried, and the soft match may be detected. Thus, one possible first name score for the sample record 154 may be three times the value represented by "A3" in FIG. 12. The value represented by "A3" may be multiplied by three because the input "bob" contains three characters.

Additionally, the input "bob" may be considered to be a soft prefix match of "Robert" (i.e., "bob" is one character off of "rob"). Thus, another possible first name score for the sample record 154 may be three times the value represented by "A4" in FIG. 12. Accordingly, the first name score for the sample record 154 may be the greater of three times the numeric value represented by "A3" and three times the numeric value represented by "A4." In general, three times the numeric value represented by "A3" may be greater because empirical testing has shown that full matches should typically be scored higher than prefix matches.

Similarly, the input "paris" may be considered to be an exact full match of the location key of the sample record 154. Accordingly, a location score for the sample record 154 may be five times the value represented by "F1" in FIG. 12. The value represented by "F1" may be multiplied by five because "paris" contains five characters. Thus, longer matches may have a greater effect of the score.

Finally, the input "oat" may be considered to match no key corresponding to the sample record 154. Accordingly, a no match score for the sample record 154 may be three times the value represented by "G5" in FIG. 12. Again, the value represented by "G5" may be multiplied by three because "oat" contains three characters.

Referring to FIG. 15, to derive a single, aggregate, sortable score for the sample record 154 for the given input text (i.e., "bob paris oat"), the various key scores and no match scores may be combined in any suitable manner. For example, the scores for each element of the input text may contribute to an overall score. In the illustrated embodiment, in the greater of three times the numeric value represented by "A3" and three times the numeric value represented by "A4" may be added to five times the numeric value represented by "F1." This resulting sum may be added to three times the numeric value represented by "G5." Accordingly, in embodiments where the value represented by "G5" is negative, it may lower the single, aggregate score 156 assigned to sample record 154.

Assuming that the single, aggregate, sortable score 156 for the sample record 154 for the given input text is "17" and a minimum threshold is set at "15," then the sample record 154 may be displayed to the user (unless a sufficient number of other records score higher and displace the sample record).

Incidentally, had the sample record 154 identified "Bob" as a nickname, it could have affected (e.g., increased) the score for the sample record 154. That is, if the sample record 154 had listed "Bob" as a nickname, the sample record 154 would have received a nickname score of three times the numeric value represented by "B1" since the input "bob" would have been an exact match. The total score for the sample record could then have incorporated the greater of three times the numeric value represented by "A3," three times the numeric value represented by "A4," and three times the numeric value represented by "B1."

Referring to FIGS. 16 and 17, if a user adds to the input text, then the search system 62 may make adjustments to the scores, ranking, etc. of the various records. For example, assuming a user continues to type and enters "bob paris oatmeal" in a search field 128, a search system 62 may score the sample record 154 in the manner illustrated.

As shown, the sample record 154 may score the same for the "bob" and "paris" portions of the input text. However, the "oatmeal" portion may add characters while continuing to produce no matching keys. If the value represented by "G5" is negative, the longer "oatmeal" portion (e.g., seven characters rather than just three characters as in "oat") may lower the single, aggregate score 156 assigned to sample record 154. This may lower the ranking of the sample record 154. For example, assuming that typing in the full "oatmeal" reduces the score 156 of the sample record 154 to "−6" and the minimum threshold is again "15," then the sample record 154 may not be displayed to the searcher, even if the sample record 154 is the best scoring record.

Accordingly, as the search system 62 runs, the sample record 154 may show up in the early results, but as the user types the whole word "oatmeal," the sample record 154 may drop in ranking and may disappear entirely from the suggestion list. This may be due to the fact that the user is saying with each key pressed that the search term "oatmeal" is increasingly important to his or her match criteria.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method comprising:
receiving, from a user, a first portion of a personal name, the first portion comprising one or more characters of a first name, a nickname, a middle name or a last name;
converting the first portion to a normalized portion of the personal name by reducing the one or more characters to their simplest equivalents;
searching a main index to identify one or more first keys matching the normalized portion of the personal name;
searching a phonetic index to identify one or more second keys matching the normalized portion of the personal name;
compiling a first plurality of suggested matches, the first plurality of suggested matches comprising the union of indexed items corresponding to the one or more first keys and indexed items corresponding to the one or more second keys; and
presenting, to the user, at least a portion of the first plurality of suggested matches.

2. The method of claim 1, further comprising ranking the plurality of suggested matches according to a predicted relevance to the user.

3. The method of claim 2, further comprising permuting the normalized portion of the personal name to identify one or more typographical permutations thereof having a Damerau-Levenshtein distance of one.

4. The method of claim 3, further comprising searching both the main index and the phonetic index to identify one or more third keys matching the one or more typographical permutations.

5. The method of claim 4, wherein the plurality of suggested matches further comprises indexed items corresponding to the one or more third keys.

6. The method of claim 1, further comprising receiving, from the user, a second portion of the personal name, the second portion being adjacent to and received after the first portion, the second portion comprising one or more characters, the first and second portions collectively forming a string of characters.

7. The method of claim 6, further comprising converting the string of characters to a normalized string of characters by reducing the one or more characters of the string of characters to their simplest equivalents.

8. The method of claim 7, further comprising searching the main index to identify one or more fourth keys matching the normalized string of characters.

9. The method of claim 8, further comprising searching the phonetic index to identify one or more fifth keys matching the normalized string of characters.

10. The method of claim 9, further comprising compiling a second plurality of suggested matches, the second plurality of suggested matches comprising the union of indexed items corresponding to the one or more fourth keys and indexed items corresponding to the one or more fifth keys.

11. The method of claim 10, further comprising presenting, to the user, at least a portion of the second plurality of suggested matches.

12. The method of claim 11, wherein the presenting of at least a portion of the first plurality of suggested matches occurs after the receiving of the first portion and before the receiving of the second portion.

13. The method of claim 12, wherein the presenting of at least a portion of the second plurality of suggested matches occurs after the receiving of the second portion.

14. The method of claim 1, further comprising receiving, from the user, a second portion of the personal name, the second portion being adjacent to and received after the first portion, the second portion comprising one or more characters, the first and second portions collectively forming a string of characters.

15. The method of claim 14, further comprising converting the string of characters to a normalized string of characters by reducing the one or more characters of the string of characters to their simplest equivalents.

16. The method of claim 15, further comprising searching the main index to identify one or more third keys matching the normalized string of characters.

17. The method of claim 16, further comprising searching the phonetic index to identify one or more fourth keys matching the normalized string of characters.

18. The method of claim 17, further comprising compiling a second plurality of suggested matches, the second plurality of suggested matches comprising the union of indexed items corresponding to the one or more third keys and indexed items corresponding to the one or more fourth keys.

19. The method of claim 18, further comprising presenting, to the user, at least a portion of the second plurality of suggested matches.

20. A computer-implemented method comprising:
receiving, from a user, a portion of a personal name, the portion comprising three or more characters of a first name, a nickname, a middle name or a last name;
converting the portion to a normalized portion by reducing the three or more characters to their simplest equivalents;
permuting the normalized portion to identify one or more permutations thereof having a Damerau-Levenshtein distance of one;
searching a main index to identify one or more first keys matching the normalized portion or the one or more permutations;
searching a phonetic index to identify one or more second keys matching the normalized portion or the one or more permutations;
compiling a first plurality of suggested matches, the first plurality of suggested matches comprising the union of indexed items corresponding to the one or more first keys and indexed items corresponding to the one or more second keys; and
presenting, to the user, at least a portion of the first plurality of suggested matches.

21. The method of claim 20, further comprising receiving, from the user, a second portion of the personal name, the second portion being adjacent to and received after the first portion, the second portion comprising one or more characters, the first and second portions collectively forming a string of characters.

22. The method of claim 21, further comprising converting the string of characters to a normalized string of characters by reducing the one or more characters of the string of characters to their simplest equivalents.

23. The method of claim 22, further comprising searching the main index to identify one or more third keys matching the normalized string of characters.

24. The method of claim 23, further comprising searching the phonetic index to identify one or more fourth keys matching the normalized string of characters.

25. The method of claim 24, further comprising compiling a second plurality of suggested matches, the second plurality of suggested matches comprising the union of indexed items corresponding to the one or more third keys and indexed items corresponding to the one or more fourth keys.

26. The method of claim 25, further comprising presenting, to the user, at least a portion of the second plurality of suggested matches.

27. A computer-implemented method comprising:
receiving, from a user, a first portion of a personal name, the first portion comprising one or more characters of a first name, a nickname, a middle name or a last name;
converting the first portion to a normalized portion of the personal name by reducing the one or more characters to their simplest equivalents;
searching a main index to identify one or more first keys matching the normalized portion of the personal name;
searching a phonetic index to identify one or more second keys matching the normalized portion of the personal name;
scoring typographically each of the one or more second keys;
identifying, via the scoring, a higher scoring portion of the one or more second keys;
compiling a first plurality of suggested matches, the first plurality of suggested matches comprising the union of indexed items correspond to the one or more first keys and indexed items corresponding to the higher scoring portion of the one or more second keys; and
presenting, to the user after the compiling, at least a portion of the first plurality of suggested matches.

28. A system for managing organizational data, the system comprising:
a processor; and
a memory coupled to the processor, the memory comprising computer-executable instructions that when executed by the processor perform operations including
receiving data from a first user defining a first organizational relationship,
receiving data from a second user defining a second organizational relationship,
generating a set of organizational relationships wherein the set of organizational relationships includes the first organizational relationship and the second organizational relationship,
receiving, from a third user, a first portion of a personal name, the first portion comprising one or more characters of a first name, a nickname, a middle name or a last name, converting the first portion to a normalized portion of the personal name by reducing the one or more characters to their simplest equivalents, searching a main index to identify one or more first keys matching the normalized portion of the personal name, searching a phonetic index to identify one or more second keys matching the normalized portion of the personal name, compiling a first plurality of suggested matches, the first plurality of suggested matches comprising the union of indexed items corresponding to the one or more first keys and indexed items corresponding to the one or more second keys, and presenting, to the user, at least a portion of the first plurality of suggested matches.

* * * * *